United States Patent
Duplys et al.

(10) Patent No.: US 12,164,636 B2
(45) Date of Patent: Dec. 10, 2024

(54) TECHNIQUES FOR PROTECTING A COMPUTER-BASED CLASSIFIER

(71) Applicant: Robert Bosch GmbH, Stuttgart (DE)

(72) Inventors: Paulius Duplys, Markgroeningen (DE); Roland Schmitz, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 238 days.

(21) Appl. No.: 17/848,633

(22) Filed: Jun. 24, 2022

(65) Prior Publication Data
US 2023/0014606 A1 Jan. 19, 2023

(30) Foreign Application Priority Data
Jul. 14, 2021 (DE) ............... 10 2021 207 471.5

(51) Int. Cl.
*G06F 21/56* (2013.01)
(52) U.S. Cl.
CPC ...... *G06F 21/566* (2013.01); *G06F 2221/034* (2013.01)
(58) Field of Classification Search
CPC ............ G06F 21/566; G06F 2221/034
USPC ............................................... 726/23
See application file for complete search history.

(56) References Cited

U.S. PATENT DOCUMENTS

| 10,089,467 | B1* | 10/2018 | Hartnett | G06N 20/00 |
| 2015/0033341 | A1* | 1/2015 | Schmidtler | G06N 20/10 726/23 |
| 2015/0096022 | A1* | 4/2015 | Vincent | G06F 21/562 726/23 |
| 2018/0198812 | A1* | 7/2018 | Christodorescu | H04L 63/1425 |
| 2020/0073959 | A1* | 3/2020 | Tian | G06F 16/152 |
| 2020/0394302 | A1* | 12/2020 | Nashimoto | G01C 21/16 |

* cited by examiner

*Primary Examiner* — Michael S McNally
(74) *Attorney, Agent, or Firm* — NORTON ROSE FULBRIGHT US LLP; Gerard A. Messina

(57) ABSTRACT

A method for protecting a computer-based classifier. The method includes determining a first similarity of a plurality of input data sets of a computer-based classifier, comparing the determined first similarity of the plurality of input data sets and a second similarity of a comparison corpus of input data sets and recognizing the possibility of an attack on the computer-based classifier when the first similarity of the plurality of input data sets and the second similarity of the comparison corpus deviate from one another in a predetermined manner.

21 Claims, 3 Drawing Sheets

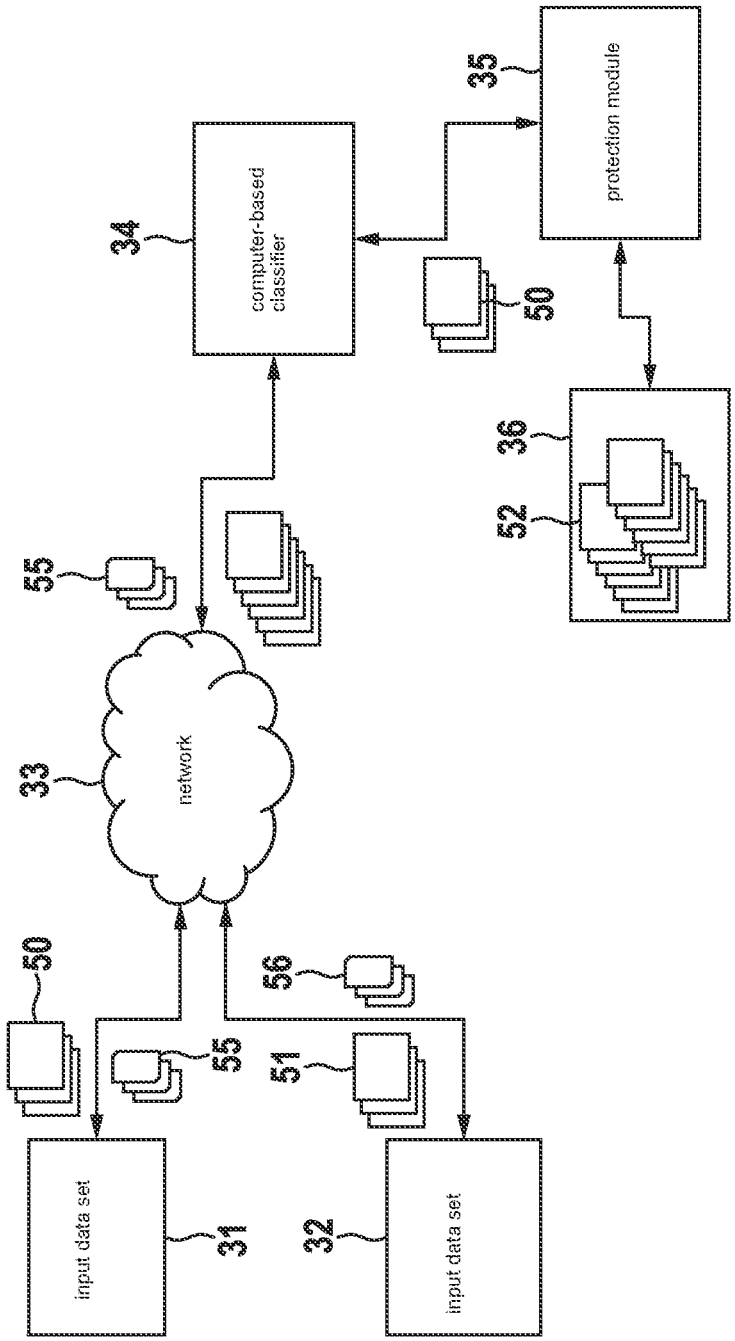

TECHNIQUES FOR PROTECTING A COMPUTER-BASED CLASSIFIER

CROSS REFERENCE

The present application claims the benefit under 35 U.S.C. § 119 of German Patent Application No. DE 10 2021 207 471.5 filed on Jul. 14, 2021, which is expressly incorporated herein by reference in its entirety.

BACKGROUND INFORMATION

Computer-based classifiers (hereinafter also "classifiers" for short) are used in many different environments in order to assess input data (i.e., to output a classification result). The classifiers may be trained with the aid of machine learning. Functions of technical systems, for example, may be triggered based on the classification result.

One first example is the recognition of safety features (such as watermarks) in digital images or in other digital data. Here, a computer-based classifier is able to distinguish images that include a safety feature from those that do not include it (when a computer-implemented function is mentioned in the present description, it is always meant by the description that the respective aim of the function is also not achieved in individual cases—the function is designed merely to achieve the aim, which may be more or less successful). In another example, a computer-based classifier in a surroundings recognition system of a vehicle may recognize objects (for example, traffic signs, roadways or other road users). As is apparent from the aforementioned examples, computer-based classifiers may have a safety-relevant influence on the system in which they are used.

For this reason, computer-based classifiers should be protected against various attacks. One type of attack is the so-called oracle attack. The aim of the oracle attack is to spy out the classification model used in the computer-based classifier (and, in particular, to ascertain boundaries between various classes of the classifier). This knowledge may, in turn, then be used to change, to generate, or to select input data sets, which deceive the computer-based classifiers. In the examples described above, image data provided with a watermark may be classified as not being provided with the watermark (i.e., the function of the watermark is overridden) or surroundings data of a surroundings sensor are manipulated in such a way that objects not present are recognized.

The knowledge about the classification model used in the computer-based classifier may also be used in order to imitate computer-based classifiers.

The present invention provides measures for protecting computer-based classifiers against attacks.

SUMMARY

One first general aspect of the present invention relates to a method for protecting a computer-based classifier, which includes determining one first similarity of a plurality of input data sets of a computer-based classifier, comparing the determined first similarity of the plurality of input data sets, and one second similarity of a comparison corpus of input data sets, and recognizing the possibility of an attack on the computer-based classifier, when the first similarity of the plurality of input data sets and the second similarity of the comparison corpus deviate from one another in a predetermined manner.

One second general aspect of the present invention relates to a device, which is designed to carry out the method according to the first general aspect of the present invention.

In some situations, the techniques of the first and second general aspects may have one or multiple of the following advantages.

An attack, in particular, an oracle attack, on the computer-based classifier may be recognized. In many situations, an attacker will send multiple, very similar input data to the computer-based classifier (for example, image data, in which a few pixel values have been changed). In this way, for example, it is possible to explore the boundaries between two classes of the computer-based classifier. The similarity of these input data of an attack may therefore be greater than a (for example, average) similarity of input data, which are received during the (normal operation of the computer-based classifier. In the techniques of the present invention, this knowledge may be utilized to recognize a possibility of an attack based on the comparison of a (for example, average) similarity of a comparison corpus of input data sets with the similarity of two or more received input data sets. Based on this information, countermeasures may then be initiated (for example, blocking a source of input data sets).

The techniques of the present invention may include comparatively simple calculation steps compared to some methods of the related art. In one example, a similarity of two input data sets may be ascertained based on a degree of difference (distance measure) of the data sets (for example, of an average pixelwise difference (distance) of the pixel values of two image data sets), and then compared in a comparison operation with a similarity of the comparison corpus of input data sets. The comparative simplicity of the calculations may then result in the techniques of the present invention being able to be carried out in a more resource-saving and/or quicker manner.

Several terms are used in the present description in the following manner.

A "computer-based classifier" in the present description is any computer-based function, which classifies input data sets into two or more classes. An input data set in this case may be assigned to a total of one or of multiple of the classes or may be classified in sections (for example, in a pixelwise or area-wise classification of image data). A computer-based classifier may be trained using the techniques of machine learning (for example, may include a neural network), but is not limited thereto. Thus, computer-based classifiers may also include other trained classifiers (for example, based on support vector machines) or in some examples may also not be trained. In the examples below, mainly image classifiers are described, which are techniques of the present description but not limited to image classifiers (unless dedicated features of image classifiers are described). The techniques described for image classifiers may therefore also be applied to other classifiers mentioned in the present description.

An "input data set" (at some points also simply "input") in the present description is any piece of data, which may be fed to (and processed by) a computer-based classifier in a particular time period in order to obtain a classification result. In some cases, an input data set is the piece of data, on the basis of which a classification process may be carried out. Accordingly, an input data set may include different data (for example, image data or time series data). A particular piece of data for a first computer-based classifier may also be a (complete) input data set, whereas the same piece of data for a second computer-based classifier may be only a part of an input data set. For example, a single image for a first image classifier may be a (complete) input data set, whereas for a second image classifier, which classifies video data, it may be only a part of an input data set.

A "similarity" of a plurality of input data sets (for example, of two input data sets) quantifies in the present description how strongly two or more input data sets differ from one another. A smaller difference is expressed by a greater similarity. A greater difference is expressed by a smaller similarity.

The expression "recognizing the possibility of an attack" merely expresses the fact that a particular criterion has been met (in the present case that the first similarity of the plurality of input data sets and the second similarity of the comparison corpus deviate from one another in a predetermined manner). This does not indicate that an attack is also actually present and/or that this may be objectively assessed. It only indicates that a particular deviation of the similarities has been recognized, which may be related to an attack.

BRIEF DESCRIPTION OF THE DRAWINGS

FIG. 3 schematically shows systems, in which the example techniques of the present invention may be used for protecting a computer-based classifier.

DETAILED DESCRIPTION OF EXAMPLE EMBODIMENTS

Figure 1:
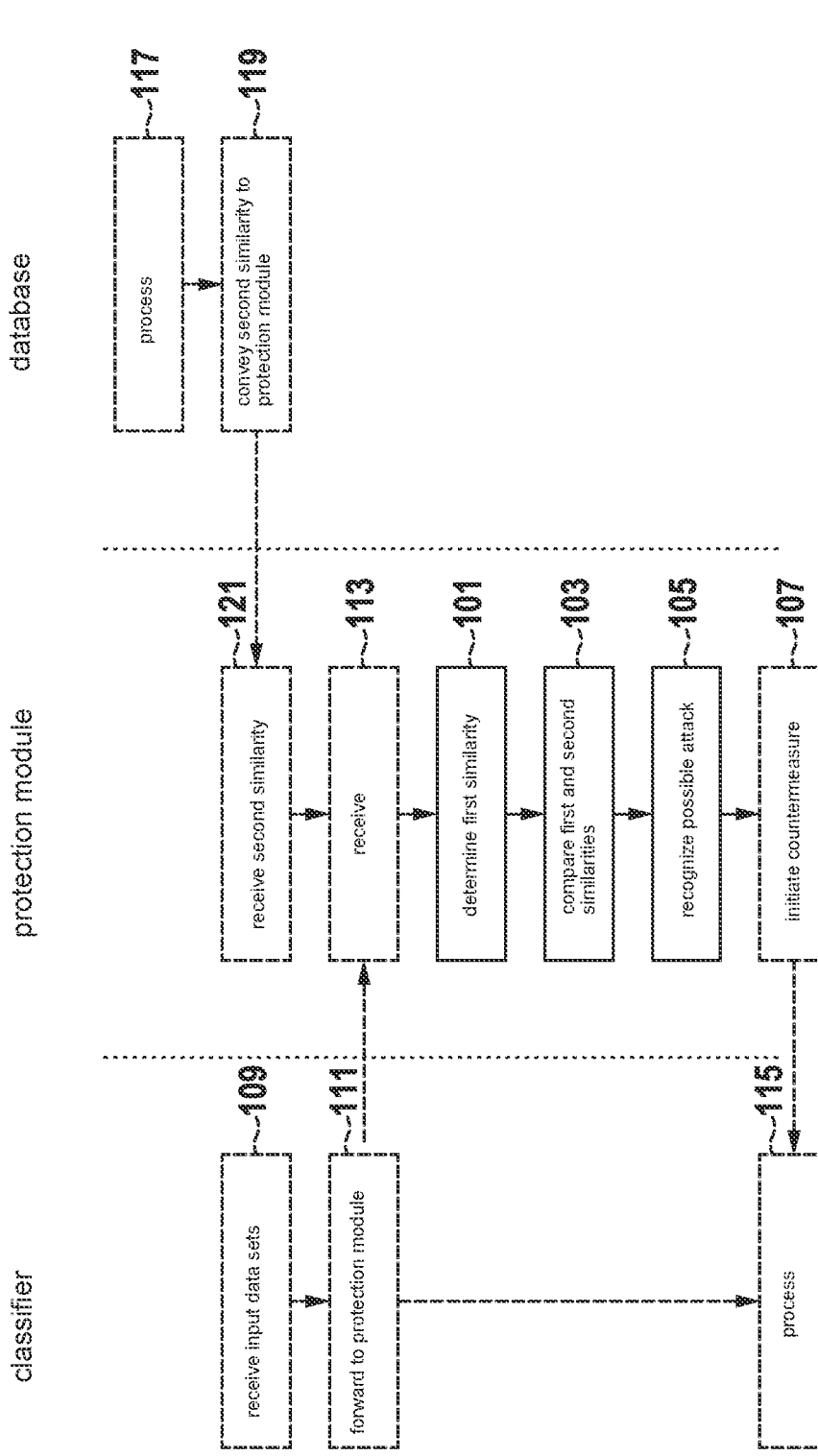
FIG. 1 is a flowchart, which illustrates example techniques of the present invention for protecting a computer-based classifier.

An overview of the techniques of the present invention for protecting a computer-based classifier is initially provided with reference to FIG. 1. Various aspects of the determination and comparison operations of the present invention are subsequently illustrated with reference to FIG. 2. Finally, various examples of applications and systems, in which the techniques of the present invention may be used for protecting a computer-based classifier are explained with the aid of FIG. 3.

A flowchart, which illustrates the techniques of the present invention for protecting a computer-based classifier, is in FIG. 1.

Actions are shown in the left-hand column of FIG. 1, which may be carried out by a computer-based classifier. The actions in the center column may be carried out by a protection module for the computer-based classifier. The actions in the right-hand column may be carried out in a (remote) database. This division is only exemplary, however. Further examples regarding the systems in which the techniques of the present invention may be used for protecting a computer-based classifier are described further below with reference to FIG. 3. In general, all method steps described herein may be computer-implemented (i.e., they are carried out on an electronic data processing unit) insofar as they are not explicitly "manually" carried out. One method for protecting a computer-based classifier includes initially determining 101 a first similarity of a plurality of input data sets of a computer-based classifier. An image classifier is used as an exemplary classifier below (further examples of classifiers are found further below). Accordingly, an input data set may be a piece of image data. The plurality of input data sets in some cases may be made up of two input data sets (for example, of two images), whose similarity is determined. In other cases, a similarity of more than two (for example, more than five or more than ten) input data sets may be determined.

Aspects for determining the similarity are explained further below with reference to FIG. 2. The plurality of input data sets may be fed during the operation of the computer-based classifier to the latter via an input channel (for example, a network interface or a sensor interface), in order to classify the input data sets (i.e., to generate a classification result for each of the plurality of input data sets). In some examples, the computer-based classifier may be designed to continuously (periodically or aperiodically) receive and to classify input data sets. The plurality of input data sets may be input data sets, which are conveyed to the computer-based classifier at a particular temporal interval (for example, not more than 5 minutes or not more than 30 seconds between two input data sets each of the plurality of input data sets) and/or at a particular interval in the sequence of input data sets of the computer-based classifier. In some examples, not more than ten additional input data sets (for example, not more than five input data sets, or not more than one input data set) are situated between two adjacent input data sets of the plurality of input data sets. In some examples, two or more of the plurality of input data sets are directly adjacent to one another (i.e., directly consecutive input data sets of the computer-based classifier).

In some cases, an attacker will attempt to convey the plurality of input data sets at a short temporal interval to the computer-based classifier in order to spy out the latter. The techniques of the present invention are able to ascertain a striking similarity of these input data sets in order to recognize the possibility of an attack.

In some examples, input data sets of an attacker may, however, also be interspersed between a plurality of other input data sets (i.e., a temporal interval and/or interval in the sequence of input data sets of the computer-based classifier may be relatively large). The attacker may, for example, attempt to disguise an attack in this manner. In some examples, the techniques of the present invention may therefore include a step of selecting the plurality of input data sets from input data sets (for example, from all input data sets) of the computer-based classifier, the similarity of which is then in turn checked. The selection of the plurality of input data sets from input data sets (for example, from all input data sets) of the computer-based classifier may, in turn, take place based on the similarity of the input data sets (for example, a particular percentage of input data sets, which have a particular similarity). In other examples, the plurality of the input data sets may be ascertained in other ways. For example, a regularity of the reception of input data sets for the computer-based classifier may be established (for example, at the same interval or at the same times). These regularly received input data sets may be selected as the plurality of input data sets from input data sets (for example, from all input data sets) of the computer-based classifier.

In some examples, the computer-based classifier of the present invention may include a particular entity (i.e., a particular device implemented as a hardware module and/or software module). In other examples, the computer-based classifier may include multiple entities (i.e., multiple devices implemented as hardware modules and/or software modules) of the same classifier model. Thus, for example, an attack may feed multiple entities of a classifier model with input data sets (which should behave essentially identically) and thereby ascertain pieces of information about the computer-based classifier. In this case, one first instance of the computer-based classifier may provide a first classification result for one first input data set, whereas one second instance of the computer-based classifier may provide a second classification result for one second input data set. The similarity of these two input data sets may be ascertained with the aid of techniques of the present invention.

The method further includes comparing 103 the determined first similarity of the plurality of input data sets and one second similarity of a comparison corpus of input data sets.

The aspects of this comparison are, in turn, explained in detail further below with reference to FIG. 2. The comparison corpus of input data sets may include historical input data sets of the computer-based classifier, or of other computer-based classifiers (which receive input data sets of the same type as the computer-based classifier to be protected). In other cases, the comparison corpus or parts of the comparison corpus may be synthetically generated.

It is important that the comparison corpus reflects the input data sets having a certain quality (for example, is a representative sample) accruing during the operation of the computer-based classifier. The techniques of the present invention are based namely on the assumption that the similarity of the input data sets of an attacker deviates in a particular manner from the entirety of the input data sets (and thus also from the representative sample). In many cases, the similarity of the plurality of input data sets of the attacker is greater than the similarity of the entirety of the input data sets. A representative sample is thus a sample, which reflects a similarity of the input data set of the entirety of the input data sets (i.e., deviates with respect to a respective similarity criterion at most by a particular degree—such as, for example, a standard deviation—of the entirety of the input data sets). However, the comparison corpus of input data may also include a non-representative sample of input data sets of the computer-based classifier. In this case, however, the reliability of the recognition of the possibility of the attack on the computer-based classier may be of a lesser degree than in the selection of a representative sample.

The method also includes recognizing 105 the possibility of an attack on the computer-based classifier, when the first similarity of the plurality of input data sets and the second similarity of the comparison corpus deviate from one another in a predetermined manner.

In some examples, the first similarity in the plurality of input data sets may be greater (for example, greater by a particular minimum degree) than the second similarity of the comparison corpus. Within the scope of an attack, attackers may select input data sets, which deviate only little from one another and therefore exhibit a high degree of similarity, in order to explore the computer-based classifier. Similar input data sets may, in particular, be used in order to determine whether relatively minor changes in an input data set result in a change of the classification result. In this way, it is possible, for example, to ascertain classification boundaries of a computer-based classifier. In the example of image data, individual pixels or an area of an image may be changed, and both the unchanged as well as the changed image may be conveyed to the computer-based classifier. The same process may be carried out repeatedly. The image data thus generated may be (much more) similar than image data that have been conveyed to the computer-based classifier during "normal operation" (i.e., when no attack is present).

If a possibility of an attack on the computer-based classifier has been recognized, one or multiple responses may take place.

In some examples, the method includes recognizing the presence of an attack based on the recognition of the possibility of an attack on the computer-based classifier. For example, the presence of an attack may be recognized when a particular number of times (also optionally in a particular time period) the possibility of an attack on the computer-based classifier has been recognized (for example, more than twice or more than five times), i.e., a first similarity of a respective plurality of input data sets and the second similarity of the comparison corpus deviate from one another in a predetermined manner. In other examples, the presence of an attack on the computer-based classifier may be recognized already with a single recognition of the possibility of an attack on the computer-based classifier. Alternatively or in addition, other criteria in addition to the deviation of the similarities may also be used in order to recognize the presence of an attack (for example, further checks of the plurality of input data or the evaluation of other pieces of information in the context of the conveyance of the plurality of the input data sets). In other words, the recognition of the possibility of an attack on the computer-based classifier may be a necessary but not sufficient condition for the recognition of an attack.

The method may also include initiating 107 one or multiple countermeasures against the attack (if an attack has been recognized).

In some cases, the countermeasures may include the identification of a source of the plurality of input data sets. For example, a network address (for example, an IP address) or another address of the source of the plurality of input data sets may be identified. In addition or alternatively, the source may be identified via a signature in the plurality of input data sets (for example, based on metadata of that of the plurality of input data sets). The information thus obtained regarding the identity of the source may be further used for repulsing the attack or for mitigating the damage.

In addition or alternatively, the countermeasures may include blocking a source of the plurality of input data sets with respect to the conveyance of further input data sets to the computer-based classifier. For example, the source of the plurality of input data sets may be set on a blacklist. The sources on the blacklist may be excluded from the use of the computer-based classifier. For example, the blacklist may include network addresses and/or signatures of sources of input data sets.

In addition or alternatively, the countermeasures may include blocking an outputting of classification results of the computer-based classifier to a source of the plurality of input data sets. For example, after initiation of the countermeasure, no classification results for the input data sets of the plurality of input data sets conveyed by the source may be conveyed.

In addition or alternatively, the countermeasures may include generating a warning that the possibility of an attack on the computer-based classifier has been recognized. The warning may be output to an interface (for example, to a human-machine interface) or to a monitoring device, which monitors the computer-based classifier.

In addition or alternatively, the countermeasures may include generating a protocol entry that the possibility of an attack on the computer-based classifier has been recognized. For example, a logbook entry may be generated that an attack has been recognized. The logbook entry may also include further pieces of information regarding the recognized attack.

In addition or alternatively, the countermeasures may include the (at least temporary) deactivation or switch-off of the computer-based classifier.

Further countermeasures may include the active neutralization of the source of the plurality of input data sets.

Depending on the countermeasure taken, the techniques of the present invention may recognize and/or stop an attack and/or prevent further attacks in the future and, in this way, protect the computer-based classifier against attacks.

If no possibility of an attack is recognized for one or for a plurality of input data sets, the one or the plurality of input data sets may be released for processing by the computer-based classifier (and, for example, a classification result may be output).

In some examples, the attack is an oracle attack on the computer-based classifier. As described above, an oracle attack is used to spy out the classification model used in the computer-based classifier (and, in particular, to ascertain boundaries between various classes of the classifier). The techniques described in the present invention may be useful, in particular, for protecting against oracle attacks. They are not, however, limited to such attacks. Instead, all attacks may be recognized, during the course of which input data sets may be conveyed to a computer-based classifier, whose similarity deviates in a predetermined manner from the similarity of a comparison corpus of input data sets.

As previously described, the first plurality of input data sets may be received 109 at the computer-based classifier and may be forwarded to protection module 111 and is received by the latter 113. In some examples, a processing of a received data set takes place separately from the check of the data set in the protection module (i.e., a classification result is generated and, if necessary, made available). In other examples (see FIG. 2) processing 115 takes place only when the protection module checks the input data set and has recognized no possibility of an attack and/or no attack on the computer-implemented classifier.

The comparison corpus may be processed 117 in the database in order to determine the second similarity of the input data sets of the comparison corpus. Input data sets may be collected for this purpose. The determination of the second similarity may take place continuously or at particular points in time. In some examples, the determination of the second similarity takes place based only on input data sets from a restricted time range, for example, based on instantaneous input data sets (for example, more recent than a year or more recent than a month). The ascertained second similarity is conveyed 119 to the protection module and received 121 by the latter in order to be processed according to the techniques of the present invention.

Having explained in the preceding paragraphs the steps of the method for protecting a computer-based classifier of the present invention, implementations of the determination and comparison operations of the present invention are illuminated in greater detail below with reference to FIG. 2.

In some examples, the first similarity of the plurality of input data sets may be based on a similarity of two or more of the input data sets or on a similarity of a section of each input data set of two or more of the input data sets. In some examples, the similarity is ascertained as a similarity of two input data sets 21, 22, i.e., one, a pairwise similarity (for example, two input data sets conveyed consecutively or in a predefined sequence to the computer-based classifier). In FIG. 2, one first 21 of the two input data sets (also referred to as A' in FIG. 2) is an instantaneous input data set and one second 22 of the two input data sets (also referred to as A in FIG. 2) is a preceding input data set (the order may, however, be different in other examples, for example, one or multiple further input data sets may be conveyed between second 22 and first 21 input data set).

Figure 2:
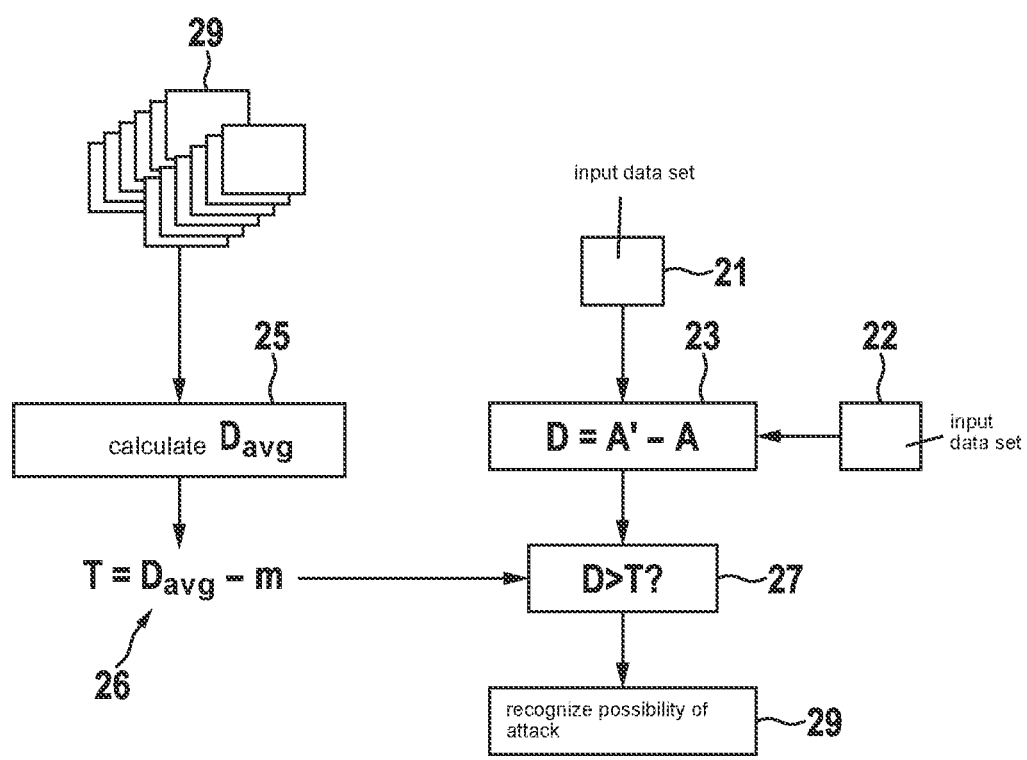
FIG. 2 shows an example implementation of the determination and comparison operations of the present invention.

In the example of FIG. 2, the first similarity is determined by a degree of difference 23 (also referred to as "D" in FIG. 2) between the respective input data sets. A smaller degree of difference may mean a greater similarity. The exact calculation rule for the degree of difference is a function of the type of input data sets. In some cases, the input data sets may be represented as matrices (for example, vectors). A degree of difference may then be calculated by an element-wise subtraction of the matrices (for example, vectors). In the example of FIG. 2, the first and the second input data sets are subtracted element-wise (for example, pixelwise) in order to ascertain the similarity (for example, according to the rule "D=A'—A" in FIG. 2). Two identical input data sets have a difference of zero in each element. The difference thus ascertained may be further processed (for example, by a simple or weighted addition and/or an averaging).

Other methods for calculating a first similarity of two matrices (for example, of two vectors) may equally be applied. It must merely be ensured that the ascertained first similarity is greater the more first 21 and second 22 input data sets resemble one another.

Also shown in FIG. 2 is the calculation of the second similarity of the comparison corpus of input data sets 24.

In some examples, the second similarity of the comparison corpus of input data sets 24 may be based on a similarity of two or more of the input data sets of the comparison corpus or on a similarity of a section of each input data set of two or more of the input data sets of the comparison corpus 24.

Thus, the average similarity ("$D_{avg}$" in FIG. 2) in some examples may be determined based on pairwise similarities for one pair or multiple pairs of the input data sets of comparison corpus 24. In this case, for example, pairs of the input data sets of the comparison corps may be formed according to the conveyance point in time of the input data sets to the computer-based classifier (for example, pairs of consecutive input data sets). In other examples, pairs may be formed according to other criteria (for example, randomly). In some examples, each input data set occurs in only one or in two pairs (for example, in a first pair including a preceding input data set and a second pair including a subsequent input data set). In still other examples, each input data set may occur in more than two pairs.

In still other examples, each input data set of comparison corpus 24 may be paired with each other input data set. In still further examples, pairs between one or multiple of the plurality of input data sets may be ascertained with the other input data sets of the plurality of input data sets.

A similarity may be ascertained for each of the pairs of input data sets of the comparison corpus 24. This may take place using the calculation rules described further above for ascertaining the (first) similarity between two input data sets of the plurality of input data sets. Thus, one of the above-described degrees of difference may be determined for each of the pairs. In many cases, the same calculation rules are used for processing the plurality of input data sets 21, 22 as well as the input data sets of comparison corpus 24.

The ascertained similarities of the pairs may be combined to form an average similarity or an average degree of difference, which may be the second similarity (for example, by a mean value formation or other averaging).

Based on the first and the second similarity, it may now be established whether the two similarities deviate from one another in a predetermined manner.

In some examples, the predetermined manner of the deviation includes a determined first similarity of the plurality of input data sets being greater than the second similarity of the input sets of the comparison corpus. For example, the predetermined manner of the deviation may include the first similarity of the plurality of input data sets being greater by a minimal degree than the second similarity of the input sets of the comparison corpus. As previously mentioned, the input data sets of an attack are characterized in some cases by a (much) greater similarity than the similarity of input data sets during "normal operation." In addition, a minimum degree of difference may prevent the recognition of the possibility of an attack from being triggered too easily.

In other examples, the predetermined manner of the deviation may include the determined first similarity of the plurality of input data sets being less than the second similarity of the input data sets of the comparison corpus. For example, the predetermined manner of the deviation may include the first similarity of the plurality of input data sets being less by a minimal degree than the second similarity of the input data sets of the comparison corpus.

In the example of FIG. 2, the ascertained second similarity (an average similarity of the comparison corpus) is initially increased 26 by a predetermined value in order to obtain an increased second similarity. Corresponding degrees of difference are accordingly reduced (in FIG. 2 the calculation rules are shown for one degree of difference, which is reduced by a predetermined value m in order to obtain a reduced degree of difference T). The increased second similarity (or the reduced degree of difference) is subsequently compared 27 with the first similarity (or with the corresponding degree of difference) (represented in FIG. 2 by the inequation "D>T?"). If the first similarity is greater than the increased second similarity (or the reduced average degree of difference for comparison corpus 24 is greater than the degree of difference of the two input data sets 21, 22), the possibility of an attack on the computer-based classifier is recognized 29. Thus, in the example of FIG. 2, the possibility of an attack is recognized if the first similarity of the input data sets is greater by a minimal degree than the second similarity of the input sets of the comparison corpus.

In other examples, the calculation rules in FIG. 2 may be varied. For example, only the first similarity or the first and the second similarity may be changed in order to check a minimal degree of difference.

In some examples, the ascertainment of the first similarity and the comparison may be carried out with each new input data set. If, for example, a third input data set is conveyed to the computer-based classifier, the first similarity between this third input data set and the preceding input data set (i.e., the first input data set 21) may be ascertained and this first similarity may be compared again with the second similarity. These steps may be repeated accordingly for further input data sets. In this way, the first similarities of a series of inputs may be sequentially checked. As mentioned, an attack may be recognized only when the possibility of an attack has been recognized multiple times.

In other cases, the first similarity may be ascertained in a different way. In some examples, the first similarity is an average similarity. Thus, an average similarity may be ascertained in the same way for more than two input data sets, as is described further above with reference to the second similarity. The average first similarity of the plurality of input data sets may then be compared with the second similarity of the comparison corpus in order to recognize the possibility of an attack on the computer-based classifier.

The first and second similarities may, as described, be ascertained in various ways. In some examples, the first and/or the second similarity is/are based on one or on multiple of an average value or on a deviation of the respective input data sets or on a similarity of a section of each input data set of the respective input data sets. Thus, in some examples, a deviation (for example, a standard deviation) from an average value of the input data sets may be a measure for the first and/or second similarity. A low deviation from an average value may, in turn, mean a minimal variability and thus a great similarity of the input data sets. If this similarity is less for the plurality of the input data sets (for example, lower by a minimum degree) than for the comparison corpus, a possibility of an attack may be recognized. Other ensemble parameters for the plurality of the input data sets and the comparison corpus may also be used for ascertaining the first or the second similarity.

As previously mentioned, in some examples, only sections or parts of the input data sets may be used for ascertaining the similarities. Thus, in the case of image data, only one section or area of each piece of image data as discussed may be processed (for example, a section of a background or including an object).

Having discussed in the preceding paragraphs the ascertainment of the similarities and their further processing, systems and applications, in which the techniques of the present invention for protecting a computer-based classifier may be used, will now be elucidated in greater detail with reference to FIG. 3.

The present invention relates to any device, which is designed to carry out the methods discussed in the present description.

As is apparent in FIG. 3, the device may include a protection module 35 for a computer-based classifier 34. Protection module 35 may be designed in any suitable manner as a hardware and/or software module. For example, protection module 35 may be a software module (the term "software module" here means that the functionality of protection module 35 is defined essentially in software and is executed on a generalized hardware; the term "hardware module" accordingly means that the functionality of protection module 35 is defined essentially in hardware; a "software" and hardware module represents a mixture). Protection module 35 may be interconnected with computer-based classifier 34.

In some examples, the device includes computer-based classifier 34. For example, protection module 35 and computer-based classifier 34 may be integrated in a software and/or hardware module. In other examples, computer-based classifier 34 and protection module 35 may be connected via a network (for example, the Internet or another wide area network or a local area network). In each case, protection module 35 may be configured to receive input data sets 40, 41 for computer-based classifier 34. Input data sets 40, 41 may be received either by computer-based classifier 34 or via another channel (for example, a further module, which receives the input data sets and forwards them to computer-based classifier 34 as well as to protection module 35).

Both computer-based classifier 34 and protection module 35 may be designed as stand-alone modules or integrated as components of a software and/or hardware system.

In some examples, computer-based classifier 34 may be connected to a network interface (not shown in FIG. 2) (or may include the latter), which is designed to receive input data sets 40, 41 for computer-based classifier via a network (for example, the Internet or another wide area network or a local area network). For example, a network interface of computer-based classifier 34 may be designed as a web interface in order to receive input data sets 40, 41. In addition, computer-based classifier 34 may be connected to an output interface (not shown in FIG. 2) (or may include the latter), which is designed to output classification results 44, 45, 46 via a network (for example, the Internet or another wide area network or a local area network. In addition or alternatively, the output interface may be a human-machine interface.

Protection module 35 may be connected to a database 36, in which the comparison corpus of input data sets 42 is stored. The database may also be designed to ascertain the second similarity of the input data sets of comparison corpus 42 and to convey it to protection module 35. In other examples, protection module 35 may ascertain the second similarity. In this case, the comparison corpus of input data sets 42 may be received by database 36. In other examples, database 36 may be integrated in protection module 35 (and, for example, may be constructed of received input data sets 40).

In FIG. 2, two sources of input data sets 31, 32 are also shown. Each source may be a computer system. Each of sources 31, 32 conveys input data sets 40, 41 to computer-based classifier 34. For example, the sources may be connected via a network 33 (for example, the Internet or another wide area network or a local area network) to computer-based classifier 34. Sources 31, 32 may receive classification results 44 from computer-based classifier 34 via network 33.

In FIG. 2, a first source 31 is an attacker, whereas a second source 32 is a benevolent user. The input data sets of both sources 31, 32 are received by protection module 35 and processed according to the techniques of the present invention. In this case, it may be recognized that first source 31 is an attacker. Protection module 35 and/or computer-based classifier 34 and/or a further module may be designed to undertake the countermeasures of the present invention (for example, to convey no classification results to first source 31 and/or to block first source 31).

In the preceding paragraphs, a case has been described, in which input data sets 40, 41 are conveyed to computer-based classifier 34 via a network 33. The conveyance of input data sets may, however, take place in other ways. For example, input data sets may be fed via a sensor system, which is connected to computer-based classifier 34. In this case, an attacker may feed selected input data sets into the sensor system. In other examples, input data sets may be fed directly into computer-based classifier 34 (for example, within the scope of an exploration of a particular computer-based classifier 34).

Having described the systems of the present invention, several exemplary applications are described in greater detail below.

As previously discussed, the computer-based classifier may be an image classifier. The image classifier may be designed to classify single images or moving images into one or multiple classes (for example, based on semantic segmentation of the single images or moving images). In this case, the input data sets are image data.

Alternatively or in addition, the computer-based classifier may be a classifier for sound data.

Further alternatively or in addition, the computer-based classifier may be a classifier for time series. The time series may include any data, on the basis of which the computer-based classifier ascertains a classification result.

The input data sets for the computer-based classifiers may be ascertained from sensor data. Exemplary sensors are cameras, radar sensors or LIDAR sensors, ultrasonic sensors, thermal sensors, and acoustic sensors.

In some examples, the computer-based classifier for recognizing a watermark or other safety feature may be in a digital data set (for example, in an image data set or a sound data set, but is not limited to these data types). The data set may, in turn, be based on sensor data (the watermark or other safety feature either already being contained in an object detected with the aid of sensors or having subsequently been inserted into the digital data set). In other examples, the data sets may be data sets generated on a computer system. A watermark refer to pieces of information, which are introduced into a data set (for example, in an image data set or a sound data set), in order to enable an authentication of the data set. In this case, the contents of the data sets are normally to be changed as little as possible and, in addition, the removal of the watermark is to be configured to be as difficult as possible.

The computer-based classifier for recognizing a watermark may now output as a classification result whether or not an input data set is provided with a watermark. This may be useful for recognizing the unauthorized dissemination of protected contents.

Attackers may now attempt to change a data set provided with a watermark or with another safety feature in such a way that a computer-based classifier for recognizing a watermark or another safety feature classifies the data set as not provided with a watermark or other safety feature (for example, in order to disseminate protected contents). This may, as described above, include relatively small changes to the data set, the changed data sets each being conveyed as input data sets to the computer-based classifier for recognizing a watermark or other safety feature. With the aid of the techniques of the present invention, it is possible to recognize the greater similarity of these input data sets as compared to the similarity of the input data sets of a comparison corpus and thus to recognize the possibility of an attack (and, if necessary, to initiate appropriate countermeasures such as blocking the {sic} . . . .

In one further example, the computer-based classifier may be designed for monitoring surroundings (for example, of a vehicle or of a monitoring device of a space or of an industrial facility). In this case, an attacker may provide the computer-based classifier for monitoring surroundings and/or a sensor system coupled to the classifier with input data sets in order to explore the computer-based classifier for monitoring surroundings. For this purpose, the input data sets may again exhibit in each case relatively small changes and thus a high degree of similarity as compared to the input data sets of a comparison corpus. With the aid of the techniques of the present invention, it is possible to recognize the greater similarity of these input data sets as compared to the similarity of the input data sets of a comparison corpus and to thus recognize the possibility of an attack (and, if necessary, to initiate appropriate countermeasures, such as the switching off of the computer-based classifier).

These applications are merely exemplary and are not exhaustive.

The devices and hardware modules of the present invention may include a processor and memory devices, which are coupled to the processor and may contain instructions so that, when they are executed by the processor, the steps of the techniques of the present invention are carried out. The devices and hardware modules may be distributed systems or be integrated in a system.

The present invention also relates to computer programs, which are designed to carry out the methods according to the present invention.

The present invention also relates to data media or signals, which contain/code the computer programs according to the present invention.

What is claimed is:

1. A method for protecting a computer-based classifier, comprising the following steps:
   determining a first similarity that characterizes a similarity between a plurality of input data sets of a computer-based classifier to one another;
   comparing the determined first similarity of the plurality of input data sets to a second similarity that characterizes a similarity between a comparison corpus of input data sets to one another; and
   recognizing a possibility of an attack on the computer-based classifier when the first similarity of the plurality of input data sets and the second similarity of the comparison corpus deviate from one another in a predetermined manner.

2. The method as recited in claim 1, wherein the second similarity of the comparison corpus of input data sets is based on a similarity of two or more of the input data sets of the comparison corpus or on a similarity of a section of each input data set of the two or more of the input data sets of the comparison corpus.

3. The method as recited in claim 2, wherein the second similarity is an average similarity, the average similarity being determined on the basis of pairwise similarities for multiple pairs of the input data sets of the comparison corpus.

4. The method as recited in claim 1, wherein the similarity is determined by a degree of difference between the input data sets of the computer-based classifier and the comparison corpus, a smaller degree of difference meaning a greater similarity.

5. The method as recited in claim 1, wherein the first similarity is a similarity of a first input data set and of a second input data set of the plurality of input data sets.

6. The method as recited in claim 1, wherein the predetermined manner of the deviation includes the determined first similarity of the plurality of input data sets being greater by a minimal degree than the second similarity of the input data sets of the comparison corpus.

7. The method as recited in claim 1, further comprising:
   determining the second similarity of the comparison corpus of input data sets.

8. The method as recited in claim 1, further comprising:
   recognizing a presence of an attack based on the recognition of the possibility of an attack on the computer-based classifier; and
   initiating one or multiple countermeasures against the attack.

9. The method as recited in claim 8, wherein the countermeasures include one or multiple of:
   identifying a source of the plurality of input data sets;
   blocking a source of the plurality of input data sets with respect to a conveyance of further input data sets to the computer-based classifier;
   blocking an outputting of classification results of the computer-based classifier to a source of the plurality of input data sets;
   generating a warning that the possibility of an attack on the computer-based classifier has been recognized;
   generating a protocol entry that the possibility of an attack on the computer-based classifier has been recognized.

10. The method as recited in claim 1, wherein:
    (i) the computer-based classifier is an image classifier, and/or a classifier for sound data, and/or a classifier for time series and/or a classifier of sensor data, and/or
    (ii) the input data sets includes image data, and/or sound data, and/or time series data and/or sensor data.

11. The method as recited in claim 1, wherein the attack is an oracle attack on the computer-based classifier.

12. A device for protecting a computer-based classifier, the device configure to:
    determine a first similarity that characterizes a similarity between a plurality of input data sets of a computer-based classifier to one another;
    compare the determined first similarity of the plurality of input data sets to a second similarity that characterizes a similarity between a comparison corpus of input data sets to one another; and
    recognize a possibility of an attack on the computer-based classifier when the first similarity of the plurality of input data sets and the second similarity of the comparison corpus deviate from one another in a predetermined manner.

13. A non-transitory data medium on which is stored a computer program for protecting a computer-based classifier, the computer program, when executed by a computer, causing the computer to perform the following steps:
    determining a first similarity that characterizes a similarity between a plurality of input data sets of a computer-based classifier to one another;
    comparing the determined first similarity of the plurality of input data sets to a second similarity that characterizes a similarity between a comparison corpus of input data sets to one another; and
    recognizing a possibility of an attack on the computer-based classifier when the first similarity of the plurality of input data sets and the second similarity of the comparison corpus deviate from one another in a predetermined manner.

14. A method for protecting a computer-based classifier, comprising the following steps:
    determining a first similarity of a plurality of input data sets of a computer-based classifier;
    comparing the determined first similarity of the plurality of input data sets and a second similarity of a comparison corpus of input data sets; and
    recognizing a possibility of an attack on the computer-based classifier when the first similarity of the plurality of input data sets and the second similarity of the comparison corpus deviate from one another in a predetermined manner;
    wherein the method includes at least one of the following five features (I)-(V):
    (I) the second similarity is an average similarity that is determined based on pairwise similarities for multiple pairs of the input data sets of the comparison corpus;
    (II) the predetermined manner of the deviation includes the determined first similarity of the plurality of input data sets being greater by a minimal degree than the second similarity of the input data sets of the comparison corpus;
    (III) the computer-based classifier includes at least one of an image classifier, a classifier for sound data, a classifier for a time series, and a classifier of sensor data;

(IV) the input data sets includes at least one of image data, sound data, time series data, and sensor data; and (V) the attack is an oracle attack on the computer-based classifier.

15. The method as recited in claim 14, wherein the second similarity is the average similarity that is determined based on the pairwise similarities for the multiple pairs of the input data sets of the comparison corpus.

16. The method as recited in claim 15, wherein the second similarity of the comparison corpus of input data sets is based on a similarity of two or more of the input data sets of the comparison corpus.

17. The method as recited in claim 15, wherein the second similarity of the comparison corpus of input data sets is based on a similarity of a section of each input data set of two or more of the input data sets of the comparison corpus.

18. The method as recited in claim 14, wherein the predetermined manner of the deviation includes the determined first similarity of the plurality of input data sets being greater by the minimal degree than the second similarity of the input data sets of the comparison corpus.

19. The method as recited in claim 14, wherein the computer-based classifier includes the at least one of the image classifier, the classifier for the sound data, the classifier for the time series, and the classifier of the sensor data.

20. The method as recited in claim 14, wherein the input data sets includes the at least one of the image data, the sound data, the time series data, and the sensor data.

21. The method as recited in claim 14, wherein the attack is the oracle attack on the computer-based classifier.

\* \* \* \* \*